United States Patent
Pauley et al.

[11] Patent Number: 5,965,075
[45] Date of Patent: Oct. 12, 1999

[54] TRIPLE EXTRUDED FRAME PROFILES AND METHOD OF PRODUCING SAME

[75] Inventors: Robert Pauley, Troutdale; Noel E. King; Douglas H. Chin, both of Marion, all of Va.

[73] Assignee: Marley Mouldings Inc., Marion, Va.

[21] Appl. No.: 09/058,479

[22] Filed: Apr. 10, 1998

Related U.S. Application Data

[62] Division of application No. 08/551,563, Nov. 1, 1995, Pat. No. 5,795,641, which is a division of application No. 08/116,153, Sep. 1, 1993, Pat. No. 5,538,777.

[51] Int. Cl.⁶ ..................................................... B28B 3/20
[52] U.S. Cl. ................................... 264/176.1; 264/172.1; 264/177.1; 156/244.11
[58] Field of Search .............................. 264/171.11, 145, 264/173.16, 171.27, 172.1, 177.1, 176.1, 148, 209.6; 156/244.11, 244.12

[56] References Cited

U.S. PATENT DOCUMENTS

| | | |
|---|---|---|
| 3,216,068 | 11/1965 | Williams . |
| 3,535,824 | 10/1970 | Kessler . |
| 3,656,260 | 4/1972 | Weaver et al. . |
| 3,685,206 | 8/1972 | Kessler . |
| 3,685,231 | 8/1972 | Blose . |
| 3,833,704 | 9/1974 | Nissel . |
| 4,076,262 | 2/1978 | Deventer . |
| 4,232,081 | 11/1980 | Pullan . |
| 4,287,749 | 9/1981 | Bachrach . |
| 4,381,273 | 4/1983 | Azzola . |
| 4,600,461 | 7/1986 | Guy . |
| 4,676,995 | 6/1987 | Fabris . |
| 4,690,862 | 9/1987 | Hoffman . |
| 4,708,351 | 11/1987 | Midooka et al. . |
| 4,722,818 | 2/1988 | Zoller . |
| 4,783,931 | 11/1988 | Kirkwood . |
| 4,898,760 | 2/1990 | Halberstadt et al. . |
| 4,970,102 | 11/1990 | Guillon . |
| 5,110,276 | 5/1992 | Farnsworth . |
| 5,112,548 | 5/1992 | Roberts et al. . |
| 5,137,675 | 8/1992 | Rabe . |
| 5,143,772 | 9/1992 | Iwasa . |
| 5,183,613 | 2/1993 | Edwards . |
| 5,267,739 | 12/1993 | Vaughan . |
| 5,267,846 | 12/1993 | Miyama et al. . |
| 5,311,711 | 5/1994 | Desir, Sr. . |
| 5,326,592 | 7/1994 | Goewey et al. . |
| 5,338,087 | 8/1994 | Gross et al. . |
| 5,403,176 | 4/1995 | Bruckmann . |
| 5,538,777 | 7/1996 | Pauley et al. ........................ 428/122 |

FOREIGN PATENT DOCUMENTS

| | | |
|---|---|---|
| A-2358972 | 2/1978 | France . |
| A-2157614 | 10/1985 | United Kingdom . |

OTHER PUBLICATIONS

"Dual and coextrusion: the happy marriage of two unlike plastics," by Robert Stedfeld, *Modern Extrusion*, Feb. 1979, pp. 51–55.

"Combination of three plastics make one rigid sructure for variety of markets," *Product Engineering*, Dec., 1976, p. 15.

Supplementary European Search Report, dated Oct. 22, 1996.

PCT International Preliminary Examination Report, dated Nov. 21, 1995.

*Primary Examiner*—Donald Loney
*Attorney, Agent, or Firm*—Sidley & Austin; Hugh A. Abrams

[57] ABSTRACT

A method is provided for triple extrusion of a foam material, a coating and one or more flexible flanges attached to the coating or foam material. All three materials are coextruded through a common die and are useful for forming window sashes.

15 Claims, 4 Drawing Sheets

TRIPLE EXTRUDED FRAME PROFILES AND METHOD OF PRODUCING SAME

This application is a division of U.S. application Ser. No. 08/551,563, filed Nov. 1, 1995, now U.S. Pat. No. 5,795,641, which application is a division of U.S. application Ser. No. 08/116,153, filed Sep. 1, 1993, now U.S. Pat. No. 5,538,777.

FIELD OF THE INVENTION

The present invention is directed to triple extruded frame profiles, preferably window sashes, comprising an extruded body of foam plastic, a co-extrusion coating on at least one surface of the foam plastic, and at least one co-extruded flange on the coating or foam plastic. A method is provided for producing a triple extruded window sash member.

BACKGROUND OF THE INVENTION

Due to the increasing cost of wood and the attendant cost of detailing wood pieces for building construction, there is a demand for alternatives to solid wood construction products. A particularly detailed piece used in construction of homes and other buildings is a wood window frame, particularly the two panel sliding sashes (double hung) wherein the panels lock together when in the closed position. This type of window requires intricate wood detailing since the profiles of the sashes require grooves to interlock with the exterior (immovable) portion of the window frame, as well as grooves to accommodate single and double pane glass, as desired. The invention may also be used to manufacture other profiles, such as round top, tilt, casement, etc.

Typically, wood sashes are made by intricate cuts into solid pieces of wood, with the final assembly, such as cutting drainage ports, waterproofing and sealing, done by hand. The present invention obviates the need for much of this handwork, while also providing an energy-efficient, durable, and low maintenance product.

A particular advantage of the present invention is that frame profiles may be provided which are energy efficient by use of materials which are more insulative than wood without the need for metal (such as aluminum) sealing or weather-protection. The use of metal on a frame profile diminishes insulative properties. The energy-conservation considerations are particularly important in view of increasingly stringent energy rating compliance standards for windows based on NFRC (National Fenestration Rating Council) U-Values which are being imposed by building code jurisdictions. To meet or exceed these standards, it is desirable to provide a frame profile which is not solid wood, requires minimal hand-work, and which avoids use of metal or energy-inefficient butyl rubber sealers between the glass panes and frame profile.

The present invention provides frame profiles that are not made of solid wood and which can be formed by a triple co-extrusion process whereby the core material of the frame profile is an extrudable foam plastic, at least partially coated with a weather-resistant plastic co-extrusion coating, and further co-extruded with a fluid material to form flexible flanges or ridges to provide sealing and water deflection where desired. The present invention also provides a triple co-extrusion die for making such extruded profiles.

It is therefore an object of the present invention to provide an improved method for making an extruded window sash comprising a foam plastic core material, an outer weather-resistant coating and flexible flanges for sealing and/or water deflection on the coating or core material.

It is a further object of the present invention to provide improved, elongated frame members made of synthetic materials which have improved energy-ratings and which are formed by a triple extrusion process.

It is yet another object of the present invention to provide extrusion dies for triple extrusion of a foam core material, a coating material and flexible flange forming material.

These and other objects will be apparent from the following description and claims, and from practice of the invention.

SUMMARY OF THE INVENTION

The present invention provides a process for forming by extrusion a profile of extrudable material having a coating on at least one portion of its surfaces and at least one flange attached to the coating or extrudable material. The flange may be a material different from the coating material. The process comprises the step of extruding the core material in a compression stage by passage through an orifice of a predetermined profile, applying to at least one surface of the extruded material a second material in fluid form in a coating stage within the orifice, then applying to the core material or coating in a flange-forming stage within the orifice a third material whereby the third material is extruded through a slot within the orifice to form a strip, one edge of which is contact with the coating or core material, to thereby to form a flange; then withdrawing the profile from the orifice and subjecting it to conditions for setting the extrudable material, the coating and third material, whereby such materials solidify and the coating becomes securely bonded to the core material and the flange becomes securely attached to the coating or core material. By use of this method, the present invention provides an extruded profile comprising an extruded body of core material, preferably foam plastic, a coating which is co-extruded with the core, and a co-extruded flange securely attached to the profile. An extrusion die is provided comprising a tapering orifice for compressing the core material whereby the profile at the compressed end of the orifice is of a predetermined shape; a first opening communicating with the orifice for applying a second extrudable fluid coating onto the compressed material within the orifice as the compressed material passes therethrough, and a second opening in the form of a slot communicating with the orifice for applying a third extrudable material therethrough to form a flange attached to the profile.

BRIEF DESCRIPTION OF THE DRAWINGS

In the accompanying drawings.

DESCRIPTION OF THE PREFERRED EMBODIMENTS

Figure 1:
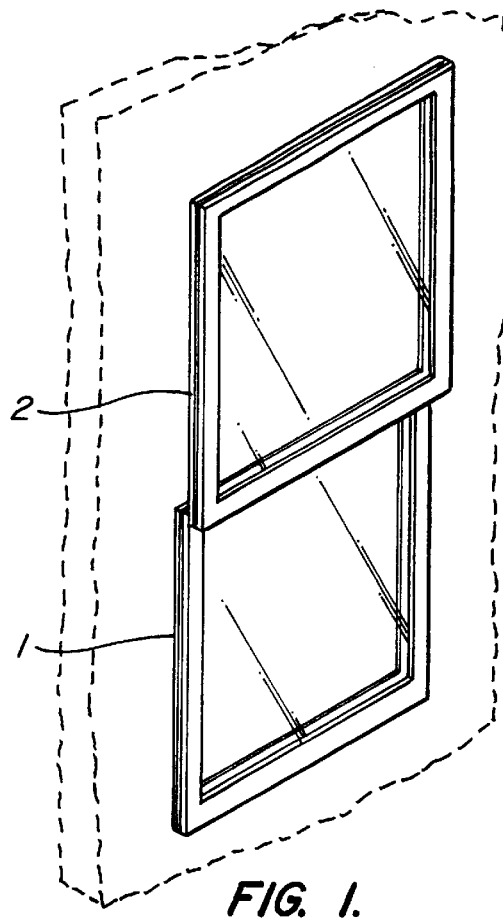
FIG. 1 is a perspective view the type of slidable windows which may be made from sashes made according to the present invention.

The triple extruded profiles according to the present invention are formed of three extrudable materials with the core being a compressible foam plastic. Since the core material will comprise most of the volume of the extruded profile, its physical characteristics will primarily define the strength and durability of the profile. Synthetic materials are preferably used and will preferably contain PVC or CPVC resins with minor amounts of additives such as process aids, process modifiers, solid fillers, and lubricants for the extrusion process and curing compounds. Process aids are materials which are known to adjust extrudability properties, thus allowing for optimization of extrusion conditions. Process modifiers are additives for adjusting physical properties of the extruded product. It is preferred that this material be extruded under sufficient compression to result in an end product (before curing and drying) of a specific gravity of about 0.60±0.1 gram per cubic centimeter. This specific gravity allows the construction of windows which comply with energy-ratings which are higher than solid-wood profile windows. The preferred materials produce profiles which are about 2.5 times more thermally efficient than solid wood. The primary component of the core material is preferably a chlorinated polyvinyl chloride resin which will comprise at least 50% by weight of the extrudable composition (not including water), and preferably about 65±15% by weight of the extrudable composition. Another component used in place of, or preferably in combination with, the chlorinated polyvinyl chloride resin is polyvinyl chloride resin, which will comprise at least about 10% of the extrudable composition (excluding water) and preferably about 15%±5% of the composition.

The remaining portions of the core composition will comprise stabilizers, acrylic materials, fillers lubricants and stabilizers.

The materials can be formed into an extrudable mixture by mixing all of the ingredients in random order at virtually any temperature below about 280° F. The preferred method of forming the core extrudable mixture is to mix the ingredients in a high intensity mixer, such as those produced by Littleford or Henschel. Typically, the polyvinyl chloride (PVC) and chlorinated polyvinyl chloride (CPVC) resins will be mixed in a high intensity mixer and monitored as the heat builds up to approximately 150° F., at which point a resin stabilizer such as alkyl tin mercaptide will be added. Other stabilizers may be used, depending upon the resins used in the core. The CPVC resins typically contain 63–70% chlorine. When the temperature rises to approximately 190° F., the acrylic process aids and modifiers, such as Paraloid KM-318F and K-125 (Rohm and Hass), and a filler such as calcium carbonate, are added. Other fillers may be used, such as talc, wallastonite, clay, mica, etc. Typically, filler loadings up to about 15% by weight are preferred. Other modifiers may be used, such as ABS, MBC and polymethyl methacrylates. With continued mixing the temperature rises, so at about 220° F. the remaining ingredients may be added, such as lubricants (calcium stearate, ester waxes, polyethylene waxes), blowing agents (such as azodicarbonamide, baking soda, baking soda/citric acid, p-toluene sulfonyl hydrazide, diphenyloxide-4,4'-disulphohydrazide, and p-toluene sulfonyl semicarbazide) and more fillers, such as titanium dioxide. When the temperature reaches about 255° F., the contents are preferably discharged to a cooler where the batch is allowed to cool to about 140° F. whereupon it is ready for extrusion.

It will be realized that other extrudable materials may be used as the core, including, but not limited to styrene maleic anhydride (SMA), acrylonitrile butadiene styrene (ABS), styrene acrylonitrile (SAN, including alpha-methyl and methyl methacrylate types), blends of PVC/ABS, PVC/ polyimide, PVC/SMA, PVC/SAN, PVC/CPVc/polyimide, PVC/CPVC/SMA, PVC/CPVC/SAN, CPVC/ABS, CPVC/ polyimide, CVPC/SMA, CPVC/SAN, ABS/SAN, ABS/ SMA, ABS/SAN/SMA, SMA/SAN, and the like. In addition, fibers may be added to enhance stiffness, impart a higher use temperature for hot climates and reduce expansion/contraction with thermal changes. Milled or chopped glass, wood, cellulose, Kevlar™, ceramics, polyesters, and the like, may serve this purpose. Also, unused extruded product may be reground and recycled into the extrusion melt.

Extrudability is improved if the mixture is allowed to age before extruding, usually from around 24 hours and above, but not longer than about one month. If aged too long, the texture changes but the mixture can be reblended for a few minutes to again obtain the homogeneity necessary for extrusion. During the aging process the mixture will typically absorb water from the atmosphere, which may change the texture. The extrudability of the mixture may change since moisture acts as a plasticizer and blowing agent. Thus, if the moisture is increased, the lubricants in the composition may be increased, as well as the stabilizer levels, while also decreasing the amount of blowing agent to compensate for the additional moisture. Increasing the lubricant and stabilizer level sometimes adversely affects the flow characteristics of the composition and therefore, if needed, a flow aid such as fumed silica (such as Syloid 74 made by Davison Chemical Company) may be added in minor amounts, such as, for example 0.25%, to assist the flow of the composition. Because of the difference in moisture uptake during summer and winter, it may be more convenient to formulate different compositions for use for extrusion during the summer months and another for the rest of the year.

Ideal extrusion conditions may vary but it is most useful to extrude through a 2 inch to 3.5 inch single screw extruder. Twin screw extruders may be used to increase the extrusion rate, and/or increase density.

It is also preferred that the die be thermally balanced for the composition which is extruded at a predetermined melt temperature. In general, it is preferred to balance the die at the lower end of the temperature range which is acceptable for the extrusion.

The second material feeding through the die is a coating material, also known as a capstock, which is extruded to form a thin, protective layer over the foam core material to protect it from the weathering effects of water and exposure to sunlight. It is believed that any conventional capstock can be used which is known for this purpose, provided that it is compatible with the core foam material and is extrudable in about the melt temperature range of the foam. The preferred materials for the capstock are acrylic styrene acrylonitrile (ASA) and blends of ASA with polyvinyl chloride. The ASA is most preferred. These materials are commercially available such as Geloy 1120 (General Electric), which comes in various colors. The ASA/PVC blends are also commercially available, such as Geloy XP-1001-100 (an ASA material), which also comes in various colors. Other capstock materials include, but are not limited to, semi-rigid PVC (Duracap™), acrylics, acrylic blends and CPVC.

The third material which is co-extruded in the die with the core material and the capstock is a flexible material which is used to form flanges and/or seals. The flexible material must have sufficient cold and hot temperature properties to resist prolonged exposure to weather and sunlight and also must be sufficiently soft so that it can flex and form a seal with glass panes. However, it must not be too soft in the die. If so, when it is treated with downstream equipment, such as vacuum sizers, it is permanently deformed. The flexible material should also be compatible with the core resin and capstock material to which it is to be bonded. The components of the flexible material must also be physically stable to the extrusion and other processing temperatures so that plasticizers do not migrate to leave it in a brittle condition or vaporized to fog the glass which is eventually fitted within the profile. Many materials which are commercial meet these criteria. Preferably, the flexible material is Chemigum™ TPE 03080 Natural, a material made by Goodyear with a Shore A hardness of 80. Materials with Shore A hardness in the range of about 65–90 may be used, such as, Alcryn™ (Dupont), thermo-plastic polyurethane (Dow, BASF), NBR rubber, etc.

After extrusion through the die the materials are cooled, preferably in a water-cooled vacuum tank by pulling the profile through the tank. The cooling period should be adjusted to obtain optimum properties. If the profile is not adequately cooled, such as by pulling the profile too quickly through the tank, the melt may be stretched. The rate of extrusion is also dependent upon the vacuum maintained in the vacuum tank since the greater the vacuum the more tendency for the angles on profile to be maintained at the desired level. If the profile is pulled too fast through the tank the melt may collapse after exiting the vacuum sizer. It is therefore preferred that the profile be passed through a second sizer in the vacuum tank and that conventional methods of maintaining profiles be used such as a spreader bar to prevent profile collapse at fast pulling speeds. Preferably at least two vacuum pumps on the vacuum tank are used to maintain desired dimensions during an extrusion. Uniform temperatures within the tanks may be maintained by circulating water sprayers.

After exiting the vacuum tank and sizers, conventional means to correct warpage may be used, such as heat guns applied to areas to relieve stress and warpage which may have been incurred in the cooling and sizing operations.

The profiles of the preferred materials are then annealed before cutting to desired lengths. The annealing is preferably conducted by supporting the profiles in appropriate places in a heating oven at a temperature between about 120° and 190° F., preferably about 165°–175° F., for from about 8 hours to 24 hours, preferably about 12 hours, at low relative humidities, usually about 15% to 20%. These are preferred conditions for the preferred materials according to the present invention but it will be realized that these conditions may be adjusted to determine the most desirable annealing conditions depending on the particular materials used.

Turning now to the figures, in FIG. 1 there is shown the configuration of double slidable panel windows 1 and 2, the sashes of which are profiles made according to the present invention. The portions of the window frame which interlock on the outer edges of the sashes are not shown.

Figure 2:
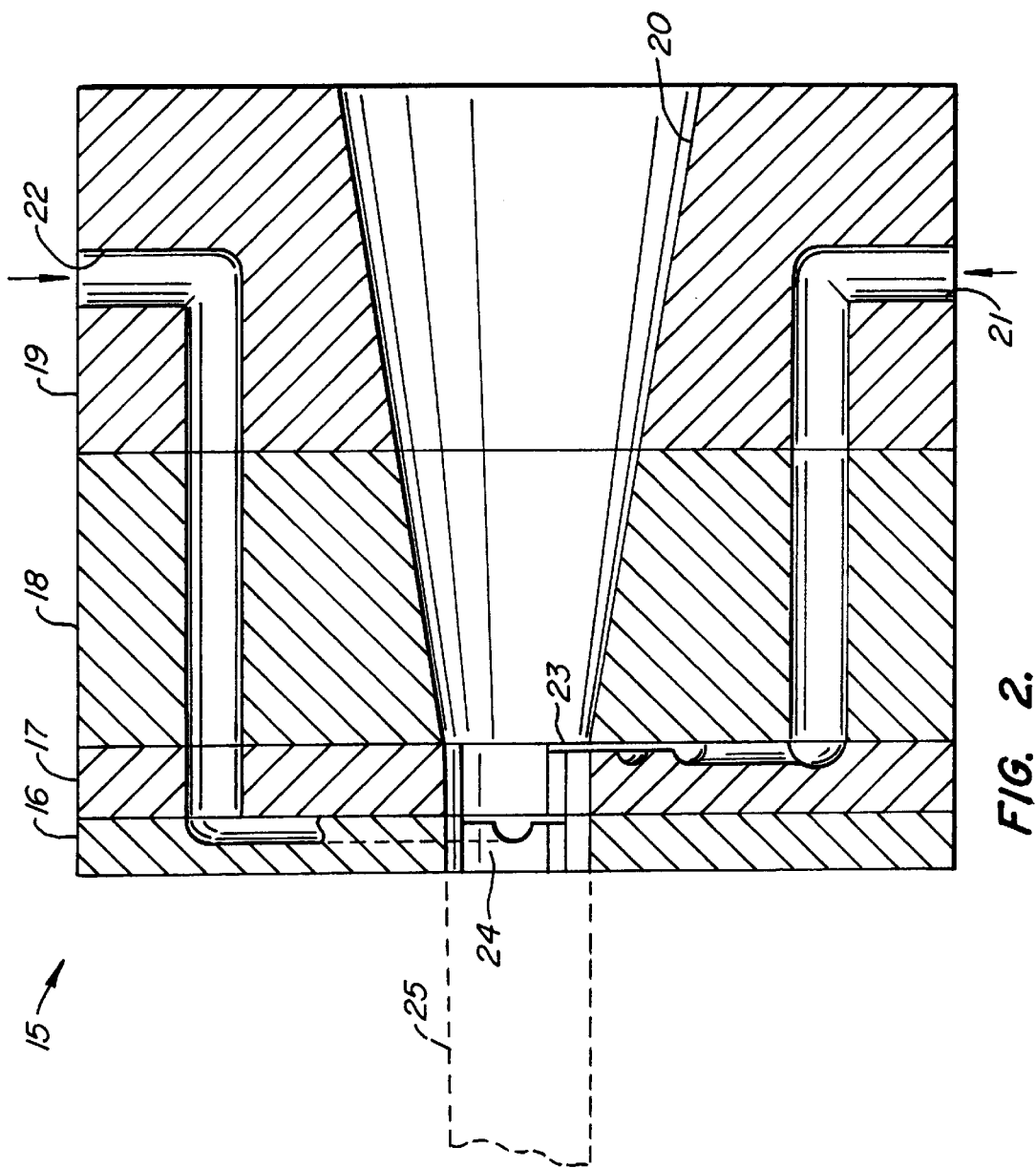
FIG. 2 is a side cross-sectional view of a preferred die according to the present invention for forming a triple extruded profile.

Referring to FIG. 2 there is shown a die 15 formed from contiguous plates 16, 17, 18 and 19 which will be described in more detail below in connection with FIG. 3. Die 15 contains a central orifice 20 which is tapering so as to compress the extrudable material as it passes through the die from right to left as shown. As shown, a channel 21 communicates among plates 19, 18 and 17 to apply the capstock material to a surface of the core material being compressed and extruded through the orifice 20. A second channel 22 is provided communicating among plates 19, 18, 17 and 16 to direct the flexible material to form the various flanges into the orifice 20. As shown in the figure the capping material is applied to this core extruded material at a location 23 which is upstream from location 24 where the flexible material is applied. The flexible material applied at location 24 may be applied onto a surface which comprises the core material or on a surface which comprises the capping material, as desired. The profile 25 exits the die 15 as shown by the shadow line and is pulled downstream for further processing such as cooling, sizing, annealing and cutting.

Figure 3:
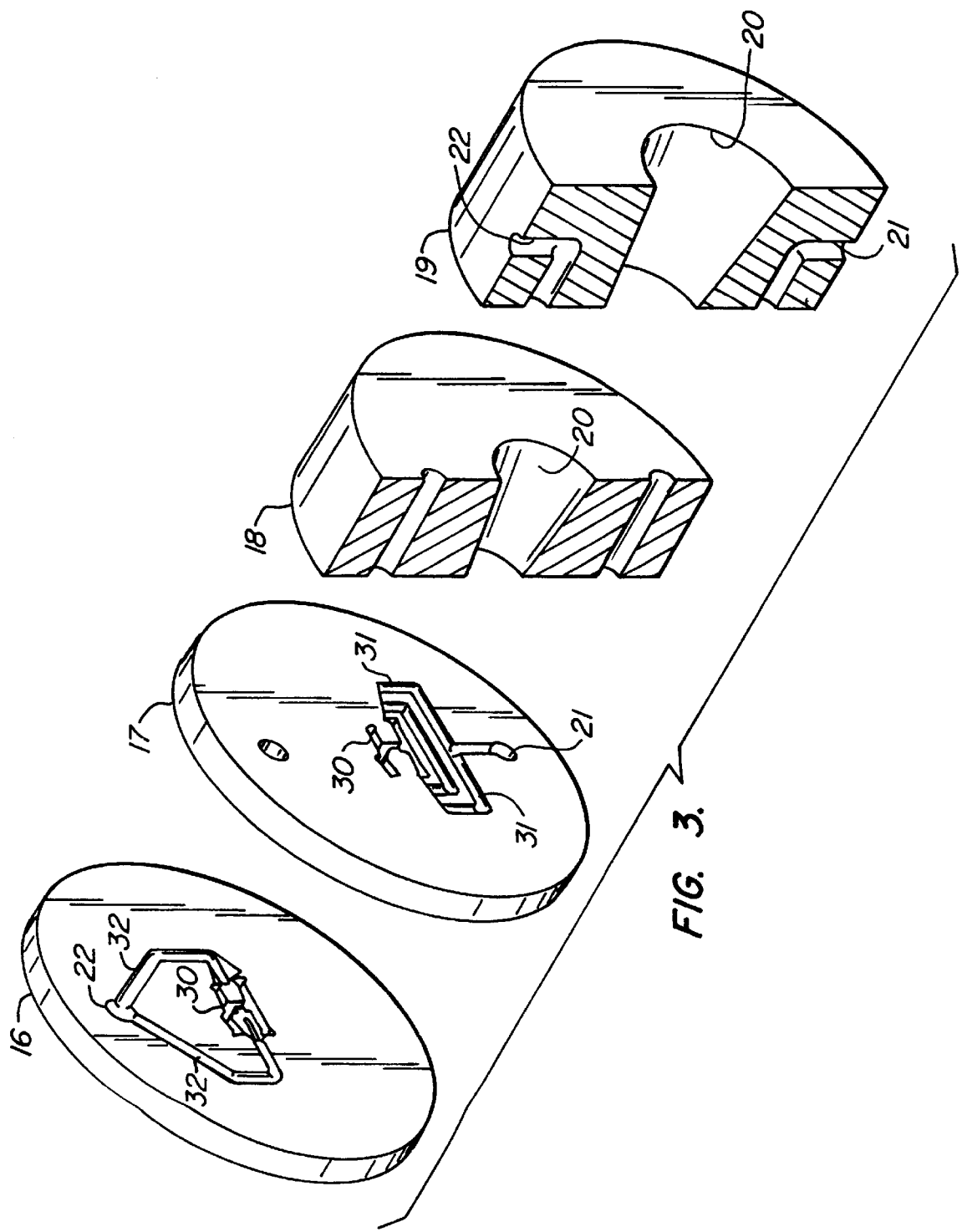
FIG. 3 is an exploded perspective view of disks which comprise a die according to the present invention, with some of the disks being in partial cross section.

Referring to FIG. 3 there are shown the plates 16 through 19 which form the complete die 15. Plates 18 and 19 are shown in cross section and parts of plates 16 and 17 are shown in partial cutaway to reveal more detail. Plate 19 accommodates the opening to orifice 20 for receiving the core extrudable material and the channels 21 and 22 for receiving the extrudable capping material and flexible material, respectively. Plate 18 accommodates a narrower portion of orifice 20 to compress the central core material and contains appropriate passages of channels 21 and 22 for passing the respective extrudable materials into plate 16 or 17. Plate 17 defines the profiles for the central core material so that the orifice 20 in plate 18 is now a well defined profile 30. Channel 21 on plate 17 then splits into channels 31 for applying the capping material on the appropriate surfaces at profile 30.

Plate 16 still defines the profile of the central core at profile 30 but channel 22 splits into subsidiary channels 32 to apply a flexible material as flanges onto the central core material or capping material, as desired. Therefore, in order to change a profile of the window sash, or to apply a coating or flange to different surfaces, plates 16, 17 and 18 may be changed with other plates having different profiles 30 and different channels 31 and 32 for applying the various extrudable materials at desired places. The plates 18 and 19 may be used in combination with different sets of plates 16 and 17.

Figure 4:
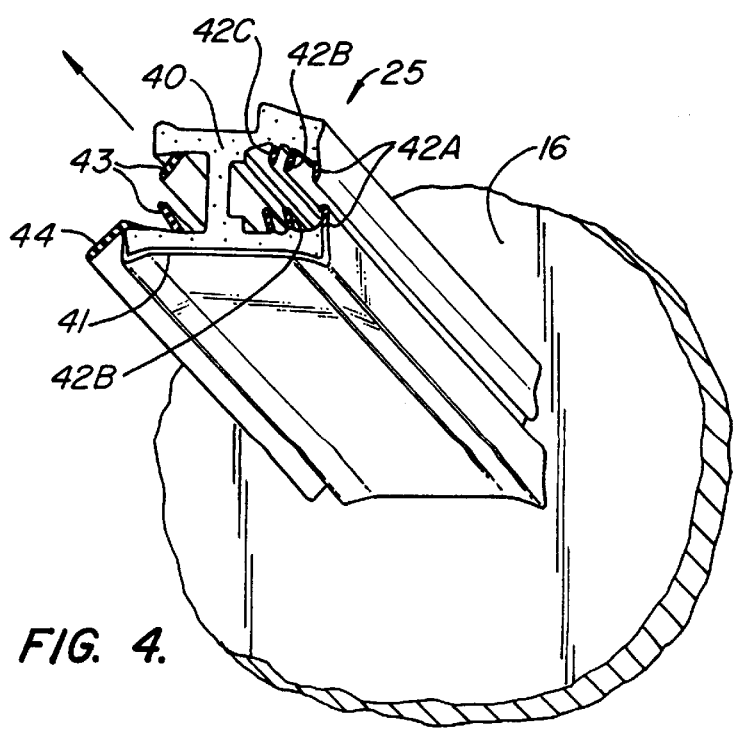
FIG. 4 is a perspective view of a triple extruded window sash as it emerges from the die.

Referring now to FIG. 4 there is shown a completed profile 25 exiting from plate 16. In the particular embodiment shown the core foam material 40 forms most of the profile. A thin layer of the capping material 41 is coated on a lower surface of profile 25 which is intended to be the exterior facing surface of the window sash. Flexible flanges 42A, 42B and 42C form seals for accommodating the glass panes which are to be inserted into a slot defined by the profile. Flexible flanges 43 are provided to form seals with the grooves of the exterior portion of the window frame (not shown). Flange 44 is provided to deflect moisture and to avoid moisture collection on the lower lip of the surface 41, since as shown this profile will be attached such that the left side of the profile will be downwardly facing in the window frame.

Referring to FIG. 5, there are shown various profiles for different portions of the window sash. The profile shown in FIG. 5A comprises a horizontal piece on the window sash and comprises the central foam material 50, capping material 51 which extends around most of the outer surfaces of the core material 50, and flexible flanges 52 for accommodating glass panes. This configuration also contains a weep well 53 for collecting moisture and condensation. Appropriate drain holes (not shown) maybe drilled in the bottom of this well to allow moisture to be cleared.

Figure 5A:
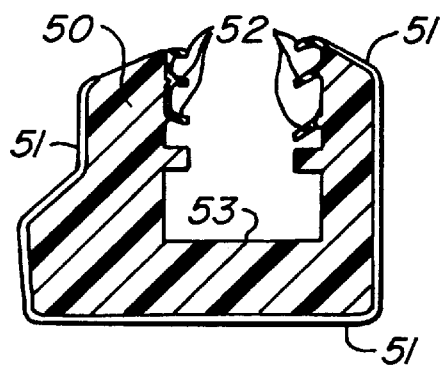
FIGS. 5A, 5B, 5C and 5D are preferred profiles of window sashes made according to the present invention.
Figure 5B:
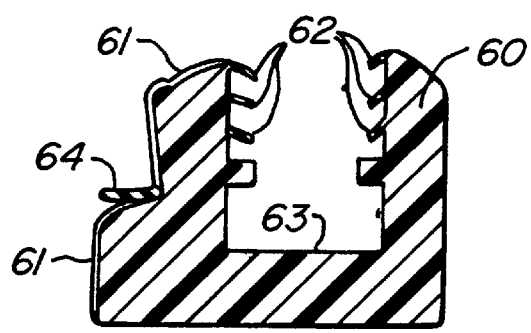

Referring to FIG. 5B there is shown another horizontal member of the window sash which comprises the central core material 60 and capping material 61 which covers only the exterior facing surface of the profile. Flexible flanges 62 are provided to accommodate the window panes and there is a condensation/weep well 63. In this profile there is also a flexible flange 64 for deflecting moisture.

Figure 5C:
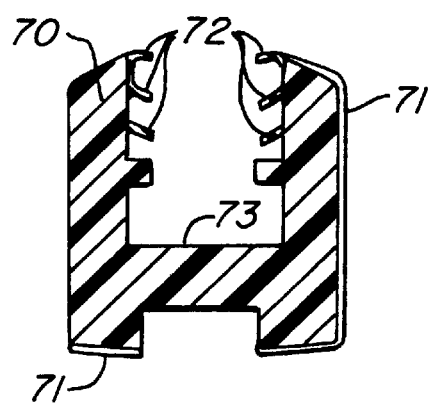

Referring to FIG. 5C there is shown a vertical member of the window sash comprising core material 70 and capping material 71. Flexible flanges 72 are provided as sealers for glass panes and there is a condensation/weep well 73.

Figure 5D:
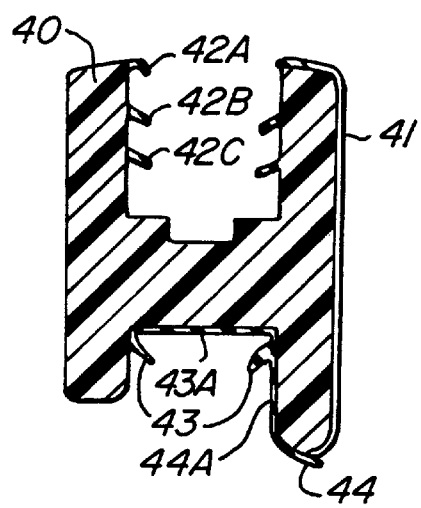

Referring to FIG. 5D there is shown the same profile that is shown in FIG. 4 comprising core material 40, capping material 41, and flexible flanges 42A, 42B and 42C. Flexible flanges 43 and 44 are shown in more detail in FIG. 5D. The flexible material 40 used to form flanges 43 and 44 has also been extended to form thin waterproof films 43A and 44A made of the same material.

It will be realized that various modifications to the preferred embodiments may be made by those in the art without departing from the spirit and scope of the invention. For example, the flange may be extruded onto the core material, and the capstock may be extruded at the final stage of the triple extrusion process. While this would require some modification of the die, such an alternative is an equivalent to the process described herein.

Having described the preferred embodiments of the present invention, the following examples are not intended to limit the invention in any way.

EXAMPLE 1

A core material was formed from the following ingredients using the indicated parts:

| Chemical Ingredient | Supplier & Trade Name | Parts |
|---|---|---|
| Chlorinated Polyvinyl Chloride Resin (67% Chlorine by Weight) | Temprite ® 627×563 B F Goodrich | 80.000 |
| Polyvinyl Chloride Resin | Vista ® 5305 Vista Chemicals | 20.000 |
| Alkyl Tin Mercaptide Stabilizer | Mark ® 1924 Witco Chemicals | 4.25 |
| Acrylic Process Modifier | Paraloid ® KM-318F Rohm & Haas | 5 |
| Acrylic Process Aid | Paraloid ® K-125 Rohm & Haas | 1.5 |
| Calcium Carbonate Filler | Atomite ® English China Clay | 5 |
| Calcium Stearate Lubricant | Synpro ® 92F Synpro | 1 |
| Ester Wax | Loxiol ® VGE 1875 Henkel Corporation | 2.1 |
| Oxidized Polyethylene Wax | AC ®-629A Allied Chemical | 0.7 |
| Azodicarbonamide | Celogen ® AZRV Uniroyal Chemical | 0.15 |
| Titanium Dioxide | Tronox ® CR-822 Kerr McGee | 1 |

The above ingredients are blended in the following manner:
1. Add to the Littleford or Henschel Mixer (A high intensity mixer) the PVC and CPVC resins.
2. Turn the mixer on to high speed.
3. When the heat builds up to 150 F add to the mixer the Mark 1924 Stabilizer.
4. When the mixer temperature reaches 190 F add the Paraloid KM-318F, Paraloid K-125, and the Atomite.
5. At 220 F add the remaining ingredients.
6. When the temperature reaches 230° F. discharge the contents of the mixer to the cooler.
7. Cool the batch in the cooler to 140 F and then discharge the blend to an appropriate container for extrusion.

The mixture described above is used to form window sashes such as those shown in the accompanying figures.

The die may be fed with a two inch screw-type extruder which is heated in various zones, preferably in zones in temperatures of 280° to 350° F., 290° and 355° F., 300° to 360° F., 310° to 365° F., and 320° to 370° F., with the die being in at a temperature between 310° and 355° F. As is typical in extrusion processes, if gas bubbles form higher temperatures in the first two zones will obviate this problem. Reduction of lubricants, increase in modifiers or extrusion aids, and reduction in blowing agent may also reduce bubbling. Passing the extrusion mixture through an ⅛ inch hole breaker plate instead of a ring prior to the die may also reduce formation of gas bubbles. Evidence of yellowing or burning of the material as it exits the die indicates that the temperature should be lowered or extrusion rates increased. The combination of chlorinated PVC and PVC foam will usually self-clean the die, therefore the operation need not be stopped for cleaning. If the temperature is too high and there is burning shown by yellowing of the extruded material the temperature should be reduced unless temperature reduction results in bubbling in which case cooling rates can be increased. Alternatively, in combination with the above solutions to bubbling and burning, stabilizer loading may be increased to reduce burning. Alternatively, external lubricants maybe interchanged, for example, highly active external unoxidized polyethylene waxes or polyprophylene waxes may be used. If the extruded material inadequately fills out the corners of the profile, air cooling of the extrusion screw should first be attempted or the die temperatures maybe increased, if that is still possible without burning. Increase in modifier level or acrylic levels and/or decrease of external lubricant levels may also mitigate the problem. Capstock material used is General Electric Geloy 1120 (ASA) (color: white 941 or driftwood 850). The flexible material is CD-02247 made by Rimtech.

EXAMPLE 2

Window sashes made as above were formed into windows and tested by conventional industry standard tests for operating force (force used to open the window sash), air infiltration, water infiltration, uniform structural load, and thermal performance pursuant to test procedures set forth under test methods AAMA 101V-86, AAMA 1604.1-88, ASTM C2376-87, ASTM D4216, ASTM D4726, ASTM D4099, ASTM F588, F842, ASTM 4803, and ASTM draft E06.51. The windows passed all the standards according to these tests. In addition, the windows were tested for flame and smoke by the E-85 tunnel test (Underwriters Laboratories test method 723) and for vertical burn (Underwriters Laboratories test method 94) and met industry standards.

What is claimed is:

1. A method of forming a solid, elongated frame member of predetermined profile having a coating on at least a portion of the surface of said member and at least one flange attached to said member, said flange being of a flexible material, comprising the steps of:
   compressing an extrudable foam material at a compression stage by passage through an orifice, said orifice having at one end thereof said predetermined profile;
   applying to at least one surface of said foam material at a coating stage within said orifice subsequent to said compression stage, a fluid coating material;

applying to said foam material at a flange-forming stage within said orifice a flexible material in fluid form whereby said flexible material is extruded through at least one slot in said orifice to form a flange, one edge of which is in contact with said foam material, thereby forming said member;

withdrawing said member from said orifice and setting said foam material, coating material and flexible material whereby said coating solidifies and is securely bonded to said foam material and said flexible material solidifies to a flexible flange forming a part of said member.

2. A method according to claim 1 wherein said member is a window sash.

3. A method according to claim 1 wherein said foam material comprises chlorinated polyvinyl chloride resin.

4. A method according to claim 3 wherein said foam material further comprises polyvinyl chloride resin.

5. A method according to claim 1 wherein said coating material comprises acrylic styrene acrylonitrile polymer.

6. A method according to claim 5 wherein said coating material further comprises polyvinyl chloride.

7. A method according to claim 1 wherein said flexible material comprises polyvinyl chloride.

8. A method according to claim 1 further comprising the step of annealing said profile piece at a temperature in a range of about 120° to 190° F. for a period of about 8 to 24 hours at a relative humidity within the range of 15–20%.

9. A method of forming a solid, elongated frame member of predetermined profile having a coating on at least a portion of the surface of said member and at least one flange attached to said member, said flange being of a flexible material, comprising the steps of:

compressing an extrudable foam material at a compression stage by passage through an orifice, said orifice having at one end thereof said predetermined profile;

applying to at least one surface of said foam material at a coating stage within said orifice subsequent to said compression stage, a fluid coating material;

applying to said coating material at a flange-forming stage within said orifice a flexible material in fluid form whereby said flexible material is extruded through at least one slot in said orifice to form a flange, one edge of which is in contact with said coating, thereby forming said member;

withdrawing said member from said orifice and setting said foam material, coating material and flexible material whereby said coating material solidifies and is securely bonded to said foam material and said flexible material solidifies to a flexible flange forming a part of said member.

10. A method according to claim 9 wherein said member is a window sash.

11. A method according to claim 9 wherein said foam material comprises polyvinyl chloride resin.

12. A method according to claim 9 wherein said foam material forms a base for a frame member, said coating material forms a covering for a portion of said frame member, and said flexible member forms a flange for contacting a window pane.

13. A method according to claim 12 wherein said coating forms a surface having a hardness greater than the hardness of said foam material.

14. A method according to claim 1 wherein said foam material forms a base for a frame member, said coating material forms a covering for a portion of said frame member, and said flexible member forms a flange for contacting a window pane.

15. A method according to claim 14 wherein said coating forms a surface having a hardness greater than the hardness of said foam material.

* * * * *